April 21, 1953  T. O. SUMMERS, JR  2,635,469
GYROSCOPIC NAVIGATIONAL INSTRUMENT
Filed May 12, 1951  8 Sheets-Sheet 1

THOMAS O. SUMMERS, JR.
INVENTOR.

BY R. E. Geangue

ATTORNEY

April 21, 1953      T. O. SUMMERS, JR      2,635,469
GYROSCOPIC NAVIGATIONAL INSTRUMENT Filed May 12, 1951      8 Sheets-Sheet 2

THOMAS O. SUMMERS, JR.
INVENTOR.

BY R. E. Geangue

ATTORNEY

THOMAS O. SUMMERS, JR.
INVENTOR.

BY R. E. Geangue

ATTORNEY

THOMAS O. SUMMERS, JR.
INVENTOR.

BY R. E. Geangue

ATTORNEY

April 21, 1953 T. O. SUMMERS, JR 2,635,469
GYROSCOPIC NAVIGATIONAL INSTRUMENT
Filed May 12, 1951 8 Sheets-Sheet 5
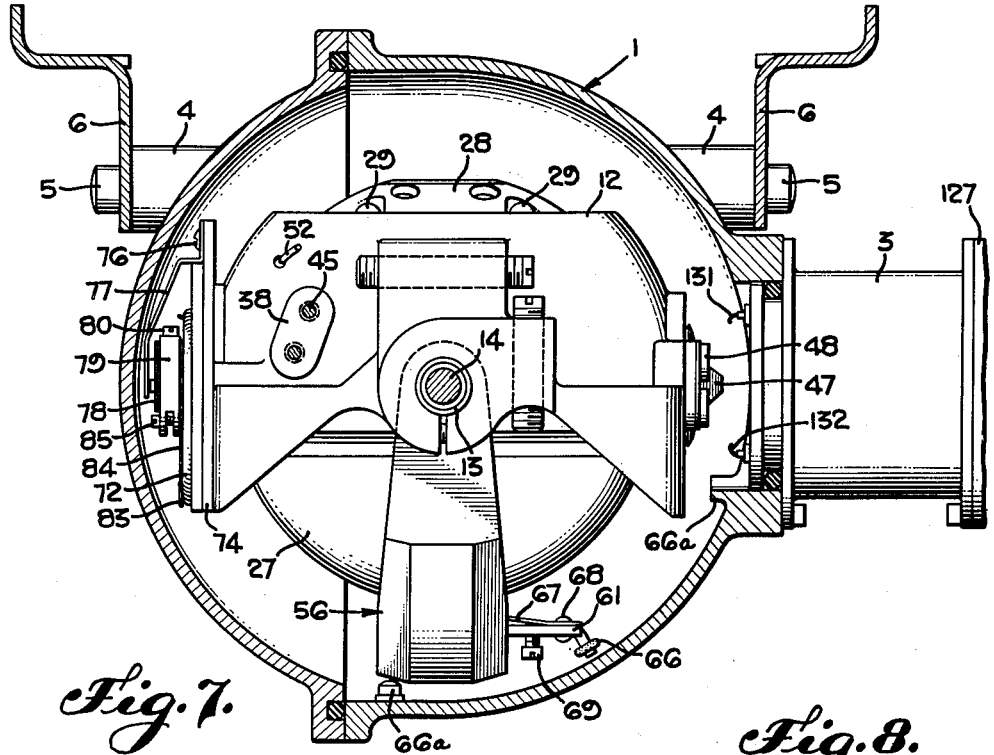
Fig. 7.
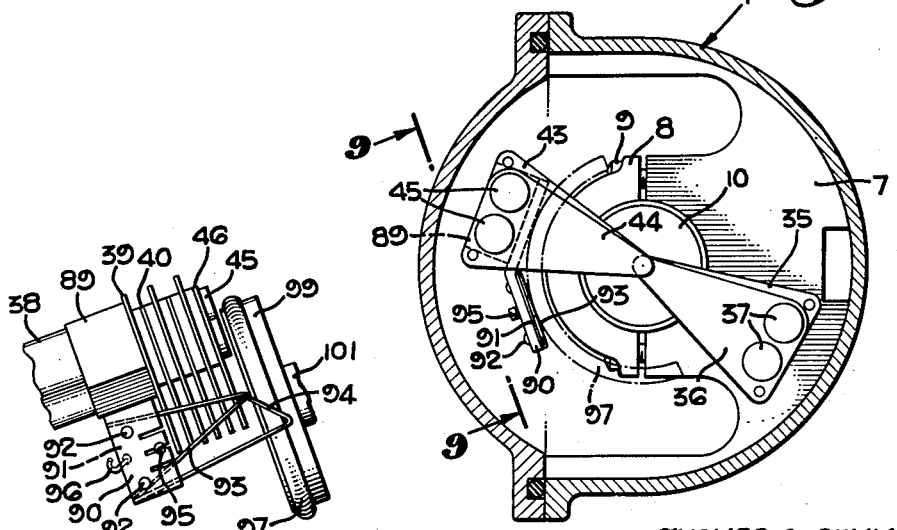
Fig. 8.
Fig. 9.
THOMAS O. SUMMERS, JR.
INVENTOR.
BY R. E. Geauque
ATTORNEY April 21, 1953     T. O. SUMMERS, JR     2,635,469
GYROSCOPIC NAVIGATIONAL INSTRUMENT
Filed May 12, 1951     8 Sheets-Sheet 6
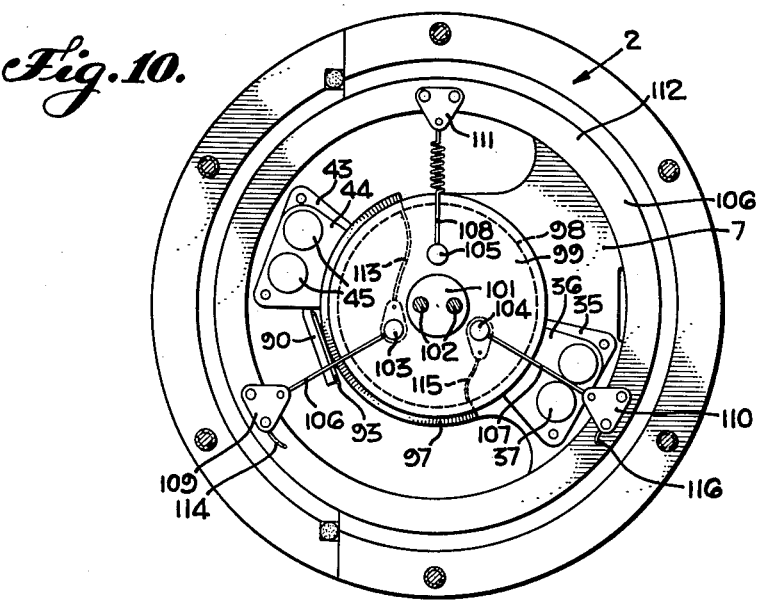
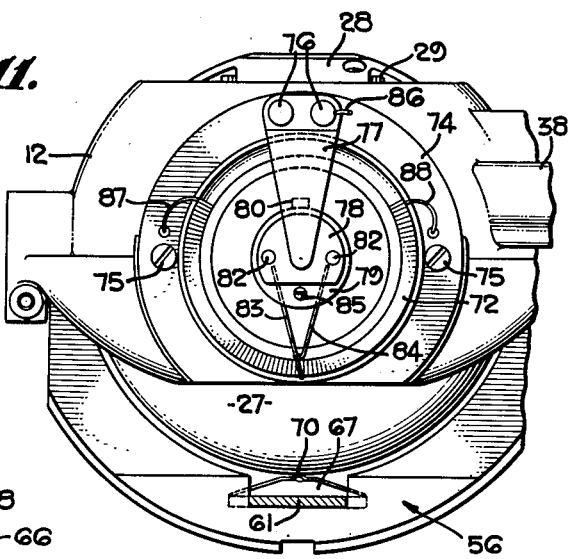
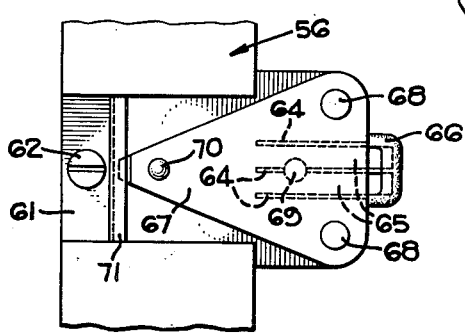
THOMAS O. SUMMERS, JR.
INVENTOR.
BY R. E. Geangue
ATTORNEY

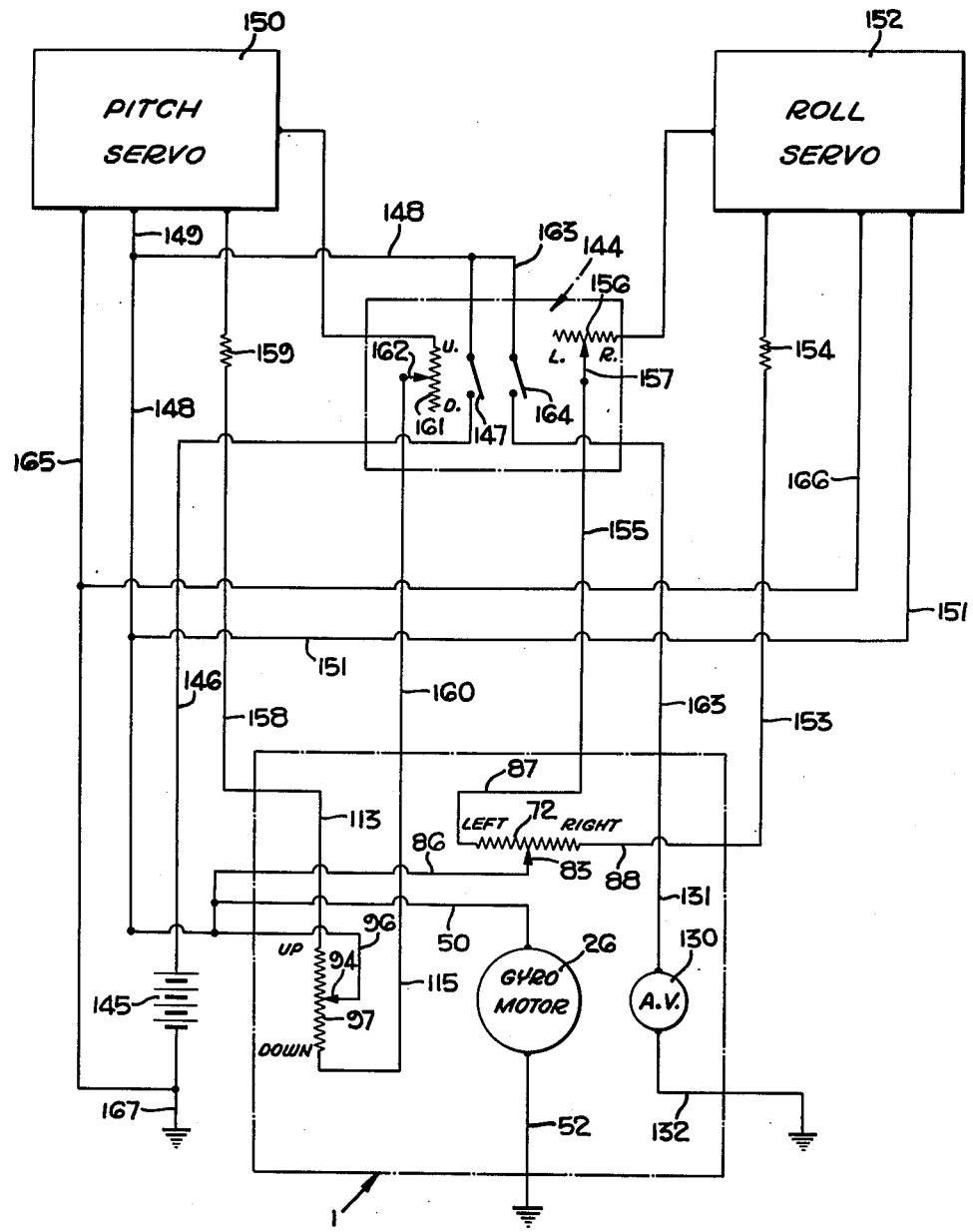

April 21, 1953 T. O. SUMMERS, JR 2,635,469
GYROSCOPIC NAVIGATIONAL INSTRUMENT
Filed May 12, 1951 8 Sheets-Sheet 8

THOMAS O. SUMMERS, JR.
INVENTOR.

BY R. E. Geauque

ATTORNEY

Patented Apr. 21, 1953

2,635,469

UNITED STATES PATENT OFFICE 2,635,469

GYROSCOPIC NAVIGATIONAL INSTRUMENT

Thomas O. Summers, Jr., Sherman Oaks, Calif.

Application May 12, 1951, Serial No. 225,997

28 Claims. (Cl. 74—5.6)

This invention relates to a control system for the control and/or navigation of aircraft, and more specifically, to a control gyroscope. One example of a control system of the class to which this invention relates is the conventional aircraft horizon indicating gyroscope. Such an indicator is used to provide the pilot of an aircraft with horizontal and vertical reference planes which remain substantially fixed with respect to the earth's surface. Such gyro verticals are useful in the navigation of aircraft under conditions of poor visibility or in the absence of a real horizon for the reason that departures of the aircraft from a desired pitch attitude can be visually detected and manually corrected. Also, departures of the aircraft in roll from a wing level attitude are discernible with the result that even in the absence of the real horizontal, it is possible for the pilot of an aircraft to fly a wing level course. However, in order to fly a straight course, it is sometimes necessary to fly with the wings other than level to account for inherent out-of-trim conditions. A perfectly trimmed aircraft may fly straight when its wings are level, but due to inherent wing imperfections that cannot be avoided in aircraft fabrication, an aircraft may be out-of-trim in roll with the result that, if its wings are maintained level, it will turn one way or the other. Whenever the vector sum of all the aerodynamic lift forces is vertical, the aircraft will fly straight, but under other conditions, a turn will result which will be a function of the degree of tilt of the lift vector. Therefore, conventional horizon indicators, while providing control means for maintaining a wing level attitude, do not necessarily provide reference means for maintaining straight flight.

It is therefore an object of the present invention to provide a gyroscopic instrument to establish the vertical plane in space about the pitch axis of the craft and the resultant lift or straight flight plane rather than the vertical plane in space in so far as the roll axis of the gyroscope is concerned. To this end the gyroscope of the invention is constructed so as to be gravity erected in pitch and case erected in roll. By case erecting the gyroscope in roll, the spin axis is erected to the average position in space assumed by the aircraft about its roll axis. Since the pilot of an aircraft has other navigational aids, such as a directional gyro and/or a rate of turn indicator, he is able to fly in a generally straight direction and, therefore, the average position in space of the aircraft about its roll axis is substantially that position at which the aircraft will fly straight. A case erected gyro roll reference seeks this average position and, therefore, provides the pilot with an improved roll reference to which he may quickly return in the event of an undesired disturbance. Such a reference makes it possible for the pilot to hold its aircraft in roll at that position at which the aircraft will fly in a straight path. A conventional gravity erected gyro horizon on the other hand will make possible the return of the aircraft to a wing level attitude, but not necessarily to that attitude in roll at which the aircraft will fly straight.

While, perhaps it is not new to gravity erect and case erect a reference gyroscope, it has not heretofore been considered feasible to utilize case erection for the purpose of controlling the aircraft in roll, for it was erroneously assumed that to case erect, or in other words, to permit the aircraft to establish its own roll reference was synonymous to omitting gravitational influence, or roll control, about a position fixed with respect to the earth's surface. Actually, to erect the gyroscope to a position in space established by the aircraft, itself, does not mean that a reference plane substantially fixed with respect to the earth's surface is not established. An airplane is an extremely gravity sensitive mass supported on air, and the slightest departure in roll from that one position with respect to the earth's surface at which it flies straight is evidenced by a turn.

The gyroscope of this invention can be included as a component of a navigational instrument to provide control signals for the craft, and therefore it is an object of the invention to provide a control system for utilizing these reference signals to control both pitch and roll of the craft. If desired, a visual indicator for the pilot can be provided which is responsive to gyro position and which can be utilized by a human pilot to guide the craft.

Another advantage of the gyroscope of the present invention becomes evident when it is employed in conjunction with rotary launchers. Several types of target aircraft are now launched by a rotary type of launcher, which comprises a circular track to accommodate a target which is tied to a pylon by a flexible link. Such a launcher makes it possible for an aircraft or missile to attain flying speed under its own power, although the craft is confined to a small area. A target aircraft so launched may make many revolutions with its wings perfectly horizontal. Under such conditions, a conventional type of gyro vertical would precess and with the result that when the craft was released from the launcher, it would go into a turn, which might result in the loss of the craft. With the gyroscope of the present invention, the aircraft may circle the launching path indefinitely, and upon launching, there will be no error, since the wings of the craft are confined to the horizontal during launching. It is therefore a further object of the present invention to provide a gyroscope which will be unaffected by acceleration forces encountered by the mounting craft when launched from a rotary type launcher.

These objects and other objects, not particularly enumerated above, will become fully apparent from the following description when considered in connection with the accompanying drawings in which:

Fig. 7 is a view similar to Fig. 6 showing the outer gimbal and pendulous bail in elevation.

Fig. 8 is a transverse section taken along line 8—8 of Fig. 5 showing engagement of the contact plates.

Fig. 9 is an auxiliary view taken along line 9—9 of Fig. 8 showing the pick-off for pitch control.

Fig. 10 is a sectional view along line 10—10 of Fig. 5 showing pick-off assembly for pitch control.

Fig. 11 is a vertical section taken on line 11—11 of Fig. 6 showing the pick-off assembly for roll control.

Fig. 12 is a plan view of the gyro erecting assembly taken along line 12—12 of Fig. 6.

Fig. 13 is a schematic wiring diagram for utilizing the control signals of the navigational instrument to control flight of the craft.

Figure 1:
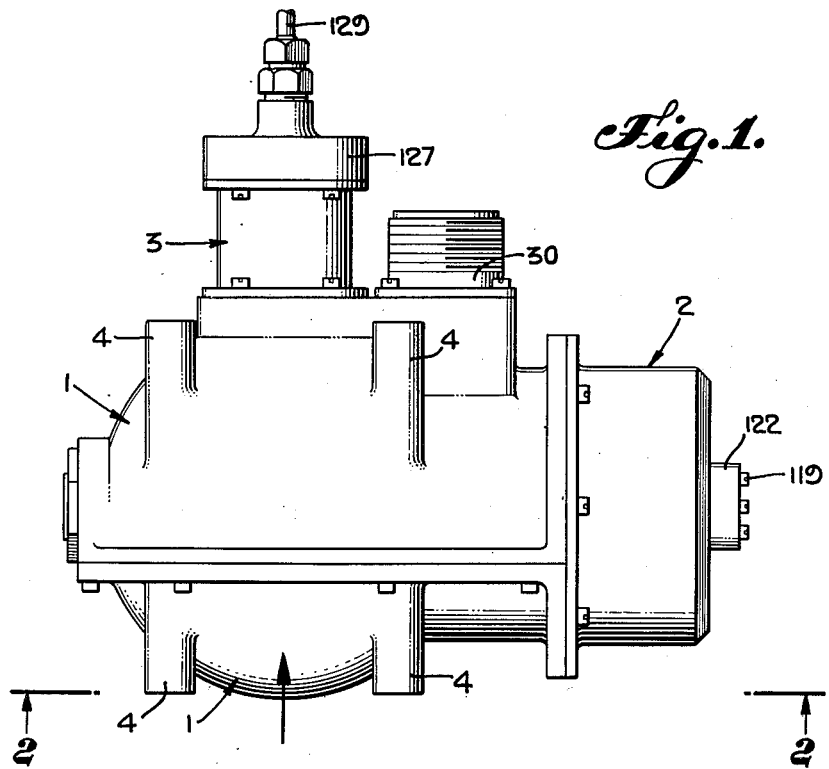
Fig. 1 is a top plan view of the casing for the navigational instrument of this invention.
Figure 2:
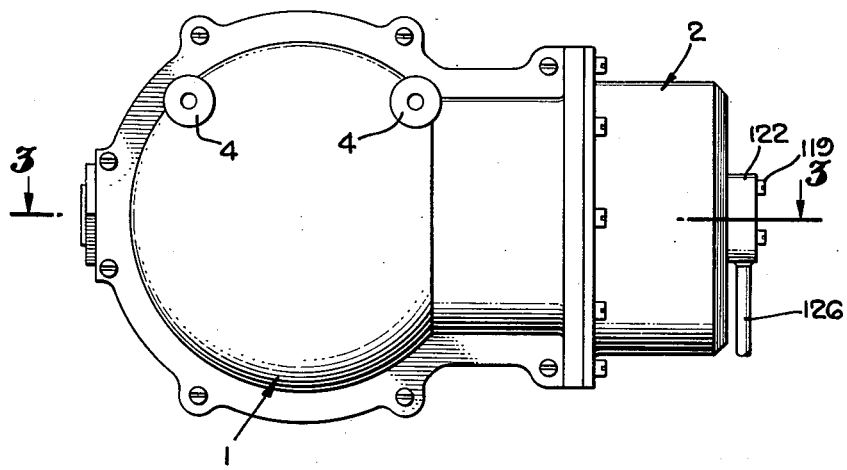
Fig. 2 is a front view in elevation of the instrument casing looking in the direction of arrows 2—2 of Fig. 1.

The gyroscopic navigational instrument of this invention is comprised of a divided casing 1, which has an extension 2 for housing the pressure sensitive element and an extension 3 for housing the valve control mechanism. The projections 4 on divided casing 1 are threaded to receive screws 5 which pass through opening in mounting brackets 6. The mounting brackets are rigidly attached to the aircraft and therefore serve to mount the gyroscopic navigational instrument within the aircraft. The direction flight of the aircraft is indicated by the arrows shown in a number of the figures. A mounting bracket 7 is integral with casing 1 and projects into the interior of the casing to provide a support for the gyroscope and for the electrical circuits. A member 8 is secured to the end of bracket 7 by screws 9 and, together with bracket 7, provides an opening for receiving the screw threaded circular bearing housing 10 (see Fig. 8). Within housing 10 is positioned a bearing race for ball bearings 11.

The outer gimbal 12 of the gyroscope, utilized in the navigational instrument of this invention, has a threaded opening for receiving a shaft supporting member 13, which terminates at one end in a shaft 14. The shaft 14 projects into housing 10 and carries a bearing race which cooperates with ball bearings 11 so as to provide one of the pivotal supports for outer gimbal 12. A second shaft supporting member 15 is threaded to the outer gimbal 12 at a position 180 degrees from member 13 and terminates in a shaft 16. A circular bearing housing 17, having external threads, is screwed into an opening in casing 1 and supports a bearing race for ball bearings 18. Shaft 16 extends within housing 17 and cooperates with bearings 18 to provide the second pivotal support for outer gimbal 12.

The outer gimbal 12 has two openings, positioned at 90 degrees from shafts 14 and 16, which receive externally threaded, circular bearing housings 19 and 20 for housing ball bearings 21 and 22, respectively. The inner gimbal 23 of the gyroscope is provided with shafts 24 and 25 which extend through bearing housings 19 and 20 respectively and cooperated with the ball bearings within the housings to pivotally support the inner gimbal 23. The motor 26 for spinning the gyro rotor 26a is supported within the inner gimbal and the rotor dome 27 is attached to the lower end of the rotor so as to spin with the rotor. In order to balance the inner gimbal, a balancing weight 28 of naval brass is secured to the upper part of the gimbal and is provided with balancing screws 29 for adjusting the effective position of the balancing weight. The function of the rotor dome will be discussed in connection wtih the description of the gyroscope erecting means.

The electrical supply for the gyro rotor motor and for the roll and pitch pick-off assemblies is provided through cannon plug 30 which has ten leads into the casing 1. Six of these leads connect with a set of six electrical contacts plates 31, 32, 33, 34, 35 and 36 which are mounted on bracket 7 by means of insulated screws 37 secured thereto. These contacts plates are separated from one another by insulated sections mounted upon screws 37. An arm 38, rigid with outer gimbal 12, carries a second set of six contact plates 39, 40, 41, 42, 43, and 44 which bear respectively against plates 31, 32, 33, 34, 35 and 36 to provide means for supplying electrical power to the components of the gyroscope which do not move with the casing 1 and the aircraft. Insulated screws 45 secure the second set of plates to arm 38 and insulated sections are carried by screws 45 to separate each plate.

Figure 3:
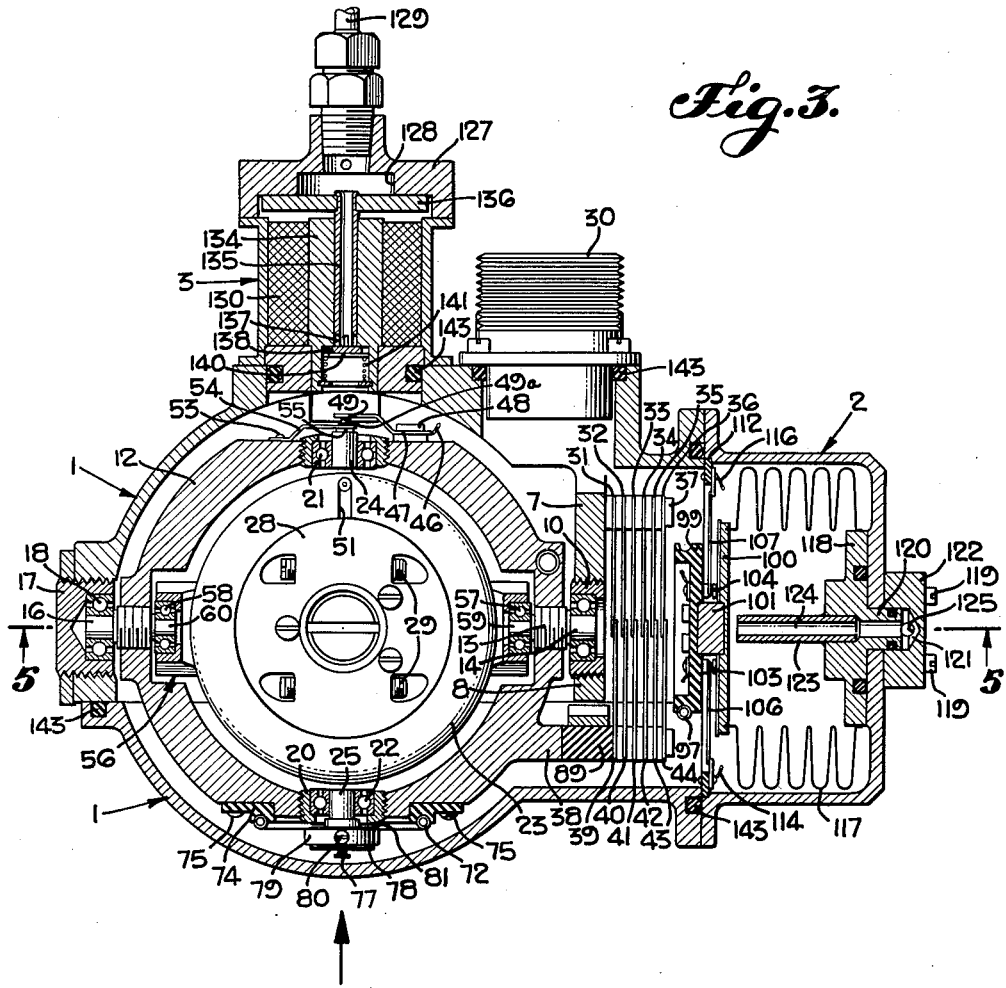
Fig. 3 is a horizontal section of the navigational instrument along line 3—3 of Fig. 2.

In order to supply electrical power to the gyro motor, the positive contact plate 39 is connected by lead 46 to conducting plate 47 (see Fig. 3). This plate is mounted on the outer gimbal 12 by means of insulated screws 48 and the plate continually bears against silver pin 49 which passes through the inner gimbal shaft 24 and connects with lead 50. Insulating cylinder 49a separates pin 49 from shaft 24. A slot 51 is provided in the inner gimbal 23 to allow the lead 50 to connect with the gyro motor 26. The negative contact plate 40 is connected by lead 52 to the outer gimbal (see Fig. 7) so as to ground the outer gimbal at all times. Also, attached to the outer gimbal by rivets 53 is the silver wire fork 54 which continually bears against contact cylinder 55 mounted in the end of shaft 24 and insulated from silver pin 49 by insulating cylinder 49a. Since the return lead (not shown) for the gyro motor is attached to the inner gimbal 23, the motor is grounded to the outer gimbal through shaft 24, contact cylinder 55 and silver fork 54. This circuit, provided for the gyro motor, allows the motor to operate regardless of the relative positions assumed by the motor and the instrument casing 1.

Erection of gyro

An important feature of the present invention is the use of a gyroscope which is gravity erected in pitch and case erected in roll. In order to accomplish this result, a pendulous bail 56 is provided which is free to move about the transverse axis of the aircraft but not about the longitudinal axis thereof. The bail 56 curves around the gyro dome 27 and has a circular opening at each end for receiving the outer races of ball bearings 57 and 58. A shaft 59 extends inwardly from member 13 and is received by ball bearings 57 while shaft 60 extends inwardly from member 15 and is received by ball bearings 58. Consequently, the shafts 59 and 60 provide means for pivotally supporting bail 56 so that it is free to rotate about the transverse axis of the aircraft.

The erecting means for the gyroscope is positioned in a cut out portion at the lower center of bail 56 and is comprised of a mounting plate 61 which is secured to the bail by means of screws 62 and 63. The plate 61 extends to one side of the bail and contains three narrow slits 64 which form two sections 65 in the plate. These sections project past the edge of the plate and are bent downwardly to act as a stop for the bail. A buffer ring 66 is placed around the ends of sections 65 to prevent a sudden contact between the ends of the sections and the two stops 66a. The triangular erector plate 67 is attached to mounting plate 61 by rivets 68 and is sprung outwardly from plate 61 by screw 69. The erector 70 is formed as a small upward projection on erector plate 67 and bears against the gyro dome 27 with a force determined by the adjustment of screw 69. When both the gyro spin axis and bail assume true vertical, the erector 70 will be along the spin axis of the gyroscope. A stop 71 is mounted by screw 62 on plate 61 and prevents erector plate 67 from being sprung an excessive amount.

The erector 70 of this invention functions in accordance with the same principal as does the caging pin shown and described in U. S. Patent No. 2,412,481 to T. O. Summers, Jr. dated December 10, 1946. Since the erector 70 continually bears against spinning dome 27, any movement of the erector away from the spin axis will result in precession of the gyroscope until the spin axis is again brought into line with the erector. This result because of the fact that when the erector is not in line with the spin axis, it exerts a friction force upon the dome and the gyroscope which is at right angles to the line between the spin axis and the erector. This friction force will cause the gyro to precess in a direction at right angles to the friction force and in a direction toward the erector. Thus, when movements of the erector 70 take place, the gyroscope will continually precess and the spin axis will follow the erector 70.

Since the pendulous bail 56 is pivoted about the transverse axis of the aircraft, the position of the bail about the pitch axis of the aircraft is determined by gravitational force and because the erector is carried by the bail, the gyroscope will be erected to gravity vertical about the pitch axis at all times. However, the bail 56 is not free to move about the longitudinal axis of the aircraft and since the shafts 59 and 60 are rigid with the casing, the bail will move with the casing about the longitudinal axis. The erector 70 will cause the gyro spin axis to follow these movements of the casing and therefore the gyroscope will be case erected about the roll axis. Thus, the reference established about the roll axis by the gyroscopic will be that required for straight flight of the aircraft regardless of the position of the vector sum of the lift forces acting upon the aircraft. The establishment of this reference is possible because the aircraft will fly straight most of the time and the position of the erector will be determined by the position of the casing during straight flight. The operation of erector 70 will be further discussed in connection with the operational description of the navigational instrument of this invention.

Roll pick-off assembly

In order to control turning movements of the aircraft, a roll pick-off assembly is provided which includes a potentiometer winding 72 mounted in groove 73 of insulating ring 74 (see Fig. 11). This ring is secured to outer gimbal 12 by means of screws 75. Also mounted on ring 74 by screws 76 is a conducting plate 77, the end of which bears against a projection on silver disk 78. The disk 78 is carried on the other face of insulating member 79, which contains a circular opening for receiving the end of inner gimbal shaft 25. A set screw 80 is positioned in member 79 in order to fasten member 79 to shaft 25 so that member 79 will rotate with the inner gimbal of the gyroscope. A second silver disk 81 is carried on the inner face of member 79 and both disks 78 and 81 are secured to member 79 by conducting rivets 82. A wiper arm 83 is soldered to disk 81 and projects across potentiometer winding 72. This arm is held in place by positioning arm 84 which is likewise soldered to disk 81 and has a loop at its end for receiving the wiper arm. A biasing screw 85 passes through member 79 and bears against disk 81 to provide for adjusting the pressure of wiper arm 83 against potentiometer winding 72.

A positive lead 86 connects with contact plate 41 and supplies electrical energy to wiper arm 83 through plate 77, disk 78, rivets 82 and disk 81. One end of potentiometer winding 72 connects with lead 87 while the other end connects with lead 88. These leads 87 and 88 pass through ring 74 and are connected respectively with contact plates 42 and 43. The winding 72 therefore acts as a current divider and as long as the wiper arm is positioned in the center of the winding, equal currents will flow through the two sides of the winding. However, when the wiper arm moves away from the center of the winding as a result of movement of the casing with respect to the inner gimbal 23, unequal currents will flow in the two sides of the winding 72. The wiring circuit for the roll pick-off assembly is shown in Fig. 13 and will be more fully explained in connection with the operational description of this invention.

Pitch pick-off assembly

In order to control pitching movements of the aircraft, a pitch pick-off assembly is provided which corrects for changes in pitch of the aircraft as well as changes in altitude. This pick-off assembly is similar in construction and function to the one described in co-pending application Serial No. 170,719 filed June 28, 1950, by T. O. Summers, Jr., and includes an insulating member 89 which is attached to arm 38 by screws 45. Secured to member 89 is a bent aluminum plate 90 which projects to one side of member 89 and mounts a conducting plate 91 by means of rivets 92. A continuous wire 93 is bent to form a triangle plus a supporting arm and one leg of the triangle forms an angular wiper arm 94. Two legs of the triangle and the supporting arm are soldered to plate 91 and a screw 95, mounted in plate 90, bears against conducting plate 91 to provide means for adjusting the pressure exerted by wiper arm 94. A positive lead 96, connecting with contact plate 44, passes through plate 90 and connects with conducting plate 91 in order to supply electrical power to wiper arm 94.

The wiper arm 94 coacts with potentiometer winding 97, which moves with casing 1, and therefore, movements of the casing with respect to the outer gimbal 12 will cause the wiper arm to change position on the winding 97. The winding is carried in groove 98 on the outside of insulated cup member 99, which is separated from disk 100 by spacing block 101. Screws 102 pass through block 101 and fasten member 99 to disk 100. Three pins 103, 104 and 105 are positioned in member 99 at 120 degree intervals and have grooved ends to which attach one end of wires 106, 107 and 108 respectively. The other end of these wires attach to plates 109, 110 and 111 which are likewise placed 120 degrees apart and are riveted to a ring 112 positioned between casing 1 and casing extension 2. The wires 106, 107 and 108 therefore serve to support and center the member 99 within the gyro casing and since wire 108 contains a coil spring section, it is possible for member 99 to move with disk 100 longitudinally of the casing extension. Lead 113 connects one end of winding 97 with pin 103 and therefore completes a return circuit to lead 114 which passes directly to cannon plug 30. Another lead 115 connects the other end of winding 97 with pin 104 and completes the return circuit to lead 116 which likewise passes directly to cannon plug 30. It is therefore seen that the current supplied by wiper arm 94 is divided by the winding 97 in a manner which depends upon the position of arm 94 on the winding.

Since the wiper arm is positioned angularly with respect to the winding 97, longitudinal movements of member 99, carrying the winding, will cause the point of contact of the wiper arm to change positions on the winding and thereby change the currents flowing in leads 114 and 116. Also, movements of the gyro casing relative to the outer gimbal resulting from changes in pitch of the aircraft will also cause relative movement between arm 94 and winding 97 and cause changes in the current flowing in leads 114 and 116. By using the angular wiper arm 94, it is possible to control both the pitch and altitude of the aircraft in a manner which will presently be described.

A metallic bellows 117 is positioned in casing extension 2 and has one end attached to and closed by disk 100 while the other end is attached to and closed by member 118 which is secured to casing extension 2 by means of bolts 119. The member 118 has a circular extension 120 which passes through casing extension 2 and into an opening 121 in block 122 and also carries a pipe section 123 which extends across the inside of the bellows. A coaxial opening 124 passes through pipe section 123 and extension 120 and connects opening 121 with the inside of the bellows 117. A passage 125 in block 122 communicates with tube 126 which continually supplies atmospheric pressure to the inside of bellows.

To casing extension 3 is attached a member 127 having an opening 128 in communication with tube 129 which is continually connected to atmosphere. The opening 128 also provides a continuous passage between tube 129 and tube 126 leading to bellows 117. An electromagnet 130 is positioned within casing extension 3 and has leads 131 and 132 passing directly to cannon plug 30 through partition 133. The core 134 for the electromagnet 130 has an opening for receiving valve tube 135 which is fastened to and passes through armature 136 so as to be continually connected with the atmospheric pressure in opening 128. One end of tube 135 has a series of slots 137 and continually bears against valve member 138, which is contained in enlarged opening 139 in core 134. The valve member 138 is mounted on plate 140 which slides in opening 139 against the pressure of spring 141, retained by means of snap ring 142 in opening 139. The plate 140 has sections cut away from its edges to provide a passage around the plate.

Figure 4:
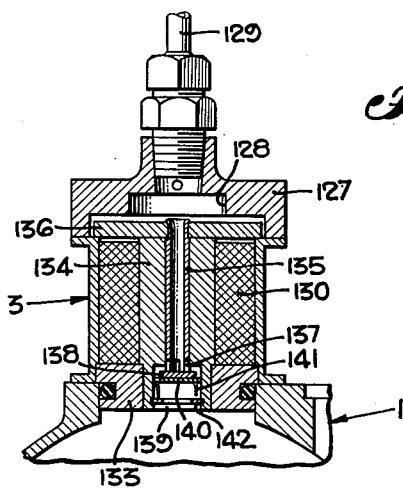
Fig. 4 is a horizontal section of the valve control mechanism as shown in Fig. 3 with the valve in open position.
Figure 5:
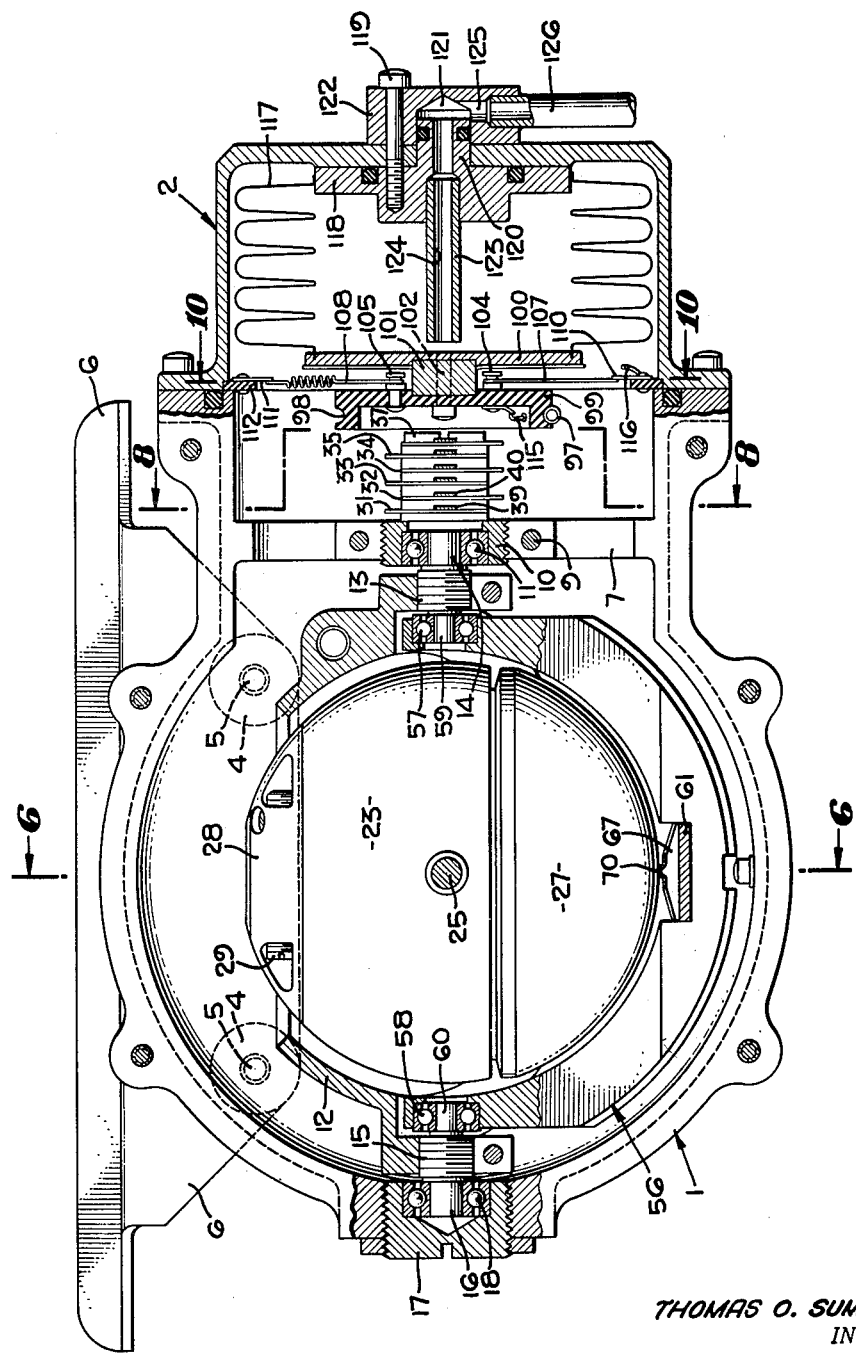
Fig. 5 is an enlarged vertical section taken along line 5—5 of Fig. 3 with the inner gimbal and gyro rotor shown in side elevation.
Figure 6:
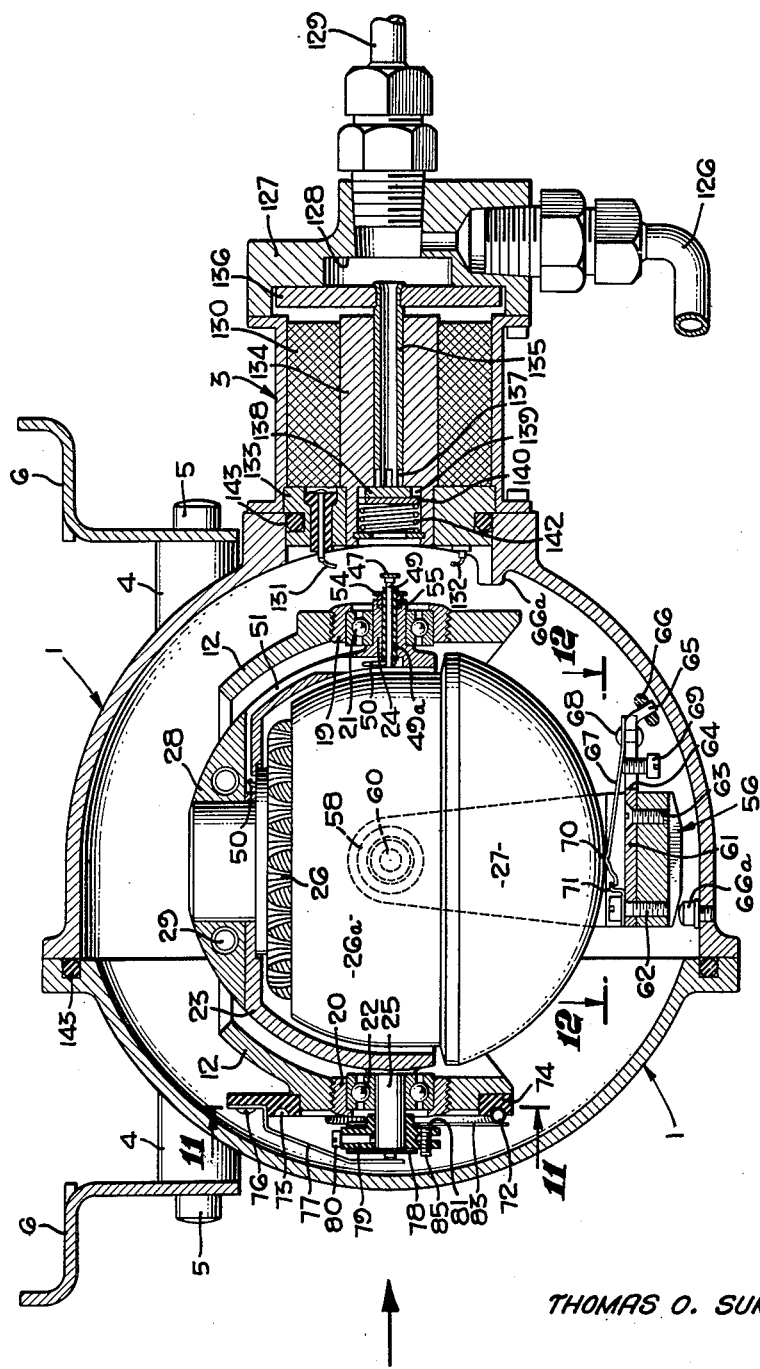
Fig. 6 is a transverse section taken along line 6—6 of Fig. 5 showing the inner gimbal in section and the gyro rotor in elevation.

The armature 136 is free to move in opening 128 and when the magnet 130 is inactive, spring 141 acting against plate 140, forces slots 137 of tube 135 into core 134 and causes valve member 138 to close the passage in tube 135 (see Fig. 6). However, when the magnet 130 is energized, the armature 136 moves slots 137 of tube 135 into opening 139 and provides a passage from opening 128 through slots 137 and around plate 140 and into the interior of the gyroscope casing (see Fig. 4). All sections of the gyro casing and casing extensions are provided with sealing rings 143 so that the casing is substantially air tight when pressure is trapped within the casing by valve member 138.

When control of the altitude of the aircraft is not desired, the magnet 130 is energized so that the inside of the gyro casing is open to atmosphere pressure and therefore, the pressure inside the casing changes with altitude. If altitude control is required, the magnet is deenergized and causes valve member 138 to trap within the gyro casing a pressure corresponding to that at the desired altitude. Since the inside of bellows 117 is continually connected to atmosphere, any change in atmospheric pressure from that at the desired altitude will cause bellows 117 to bodily move winding 97 in a direction along its axis. This movement will cause the point of contact between angular wiper arm 94 and winding 97 to change so that unequal currents will flow through the two sides of the windings and thus the elevators of the aircraft will be moved in a direction to correct for the change in altitude. The pitch control of the aircraft is effective whether or not the altitude control is being utilized. When the aircraft changes pitch, the winding 97 will rotate with the gyro casing relative to wiper arm 94 but the winding can at the same time be moved along its axis to correct for altitude change. It is therefore obvious that by the coaction of the wiper arms 83 and 94 with windings 72 and 97 respectively, it is possible to control the roll, pitch and altitude of the air-

Operation

The control circuit and the servos which form a part of this invention are shown diagrammatically in Fig. 13. The casing 1 houses the gyroscope and associated pick-offs while the pilot controls are located on instrument panel 144. A power source 145 has line 146 leading to the main switch 147 located on the instrument panel. When this switch is closed by the pilot, power is supplied to the main line 148 which has a branch 149 leading to the pitch servo 150 and a branch 151 leading to the roll servo 152. These branches provide power for motors (not shown) which are contained in each of the servos for developing power to move the aircraft surfaces. The line 148 is connected to the gyroscope motor 26 of this invention by means of lead 50 and the motor is grounded by lead 52.

The wiper arms 83 and 94 are also connected to line 148 in order to supply power to windings 72 and 97 respectively. One end of winding 72 is directly connected to the roll servo 152 by lead 153 which contain a fixed resistance 154 while the other end of the winding is connected to the roll servo by lead 155 containing a resistance 156 which can be varied by manually movable wiper arm 157. In a similar manner, one end of winding 97 is connected with the pitch servo 150 through lead 158 containing fixed resistance 159 while the other end is connected to the servo by lead 160 containing a resistance 161 which can be varied by manually movable wiper arm 162. It is pointed out that resistances 161 and 156 are twice the size of resistances 159 and 154 respectively so that the resistance in leads 153 and 155 and in leads 158 and 160 can be balanced by centering the wiper arms 157 and 162. The line 163 connects main line 148 with the electromagnet for the altitude control valve and contains a switch 164 which can be opened by the pilot when altitude control of the aircraft is desired. The leads 165 and 166 both connect with ground 167 in order to ground all the power lines which connect with pitch servo 150 and roll servo 152.

Both servos can be of the opposed magnetic clutch type wherein each servo has two clutches which coact with shafts rotating in opposite directions. The resultant output of the two clutches working against each other will then be proportional to the difference in current flowing through the two clutches and this output will operate the control surfaces of the aircraft against the aerodynamic forces which tend to streamline them. It is therefore possible to adjust the output of either servo so that it will maintain its control surface in any position desired for flight control.

If it is desired to place the aircraft, equipped with this invention, on a straight and level course, the pilot would first adjust wiper arm 157 until the aircraft maintains a straight course as indicated by other flight instruments in the cockpit. Due to the unbalance of the lift forces of most aircraft, the wings of the aircraft must be tilted from the horizontal slightly if straight flight is to result and therefore the ailerons controlled by servo 152 must be maintained in an appropriate position in order to keep the wings suitably tilted. Since the gyroscope of this invention is case-erected in roll, the wiper arm 157 must be adjusted so that the position assumed by the gyroscope and the wiper arm 83 for straight flight will cause unequal currents to flow in lines 153 and 155 which are sufficiently unequal to cause the servo to develop an output equal to the aerodynamic forces on the aileron when positioned for straight flight. Once the arm 157 has been so adjusted, any deviations of the aircraft from straight flight will cause the winding 72 to move relative to wiper arm 83 and either increased or decreased power will be provided by the roll servo to move the aileron in a direction to bring the aircraft back to straight flight. Therefore, once the aircraft has been set on a straight course, the gyro will be case-erected by the erecting precessor 70 to a position which will provide the correct roll reference for continued straight flight of the aircraft.

In order to level off the aircraft equipped with this invention, it may be necessary for the pilot to adjust wiper arm 162 until the aircraft flies a level course as indicated by the other flight instruments. While this adjustment is made, the switch 164 should be closed so that the altitude control effected by bellows 117 will be inactive. Thus, it may be necessary for arm 162 to be placed in such a position on winding 161 that unequal currents will flow in lines 158 and 160 to the opposed magnetic clutches of the pitch servo 150. The difference in the currents will be just sufficient for the servo to develop a power output equal to any aerodynamic force on the elevators which may be required to maintain the aircraft in level flight. Since the gyroscope is gravity erected in pitch by bail 56, any deviation of the aircraft from level flight will cause winding 97 to move relative to the wiper arm 94 and readjust the unbalance of the currents in leads 158 and 160 so that the servo will move the elevators in a direction to bring the aircraft back to level flight. It is therefore possible to maintain the aircraft on a straight and level course once the ailerons and elevators have been positioned to maintain such a course.

In order to correct for changes in altitude which may result, as for example, when the aircraft is caught in a down draft, the switch 164 can be released by the pilot, thus trapping a pressure within the airtight gyro casing corresponding to the atmospheric pressure at the desired altitude of flight. Any change in altitude of the aircraft will result in a change in the atmospheric pressure communicated to the inside of bellows 117 and a pressure differential will result between the inside of the casing and the inside of the bellows. This pressure differential will cause winding 97 to move relative to angularly positioned wiper arm 94 and cause sufficient current unbalance between lines 153 and 155 for the pitch servo to return the aircraft to the desired altitude and then level off the aircraft.

If it is desired to turn the aircraft to the left or the right, the pilot can move the arm 157 either to the left or the right of its straight flight position and thereby unbalance the currents in lines 153 and 155 a sufficient amount to move the ailerons in the direction and in the amount required to execute the desired rate of turn. After the turn is completed, the pilot can simply return arm 157 to its position before the turn in order to resume straight flight. Also, the pitch of the aircraft can be controlled by the pilot by manually moving arm 162 up or down with respect to its level flight position to either increase or lower the altitude of the aircraft. When it is required to level off the aircraft after a desired change in altitude, the pilot need merely return arm 162 to its original position for level flight.

*Visual indicator*

Figure 14:
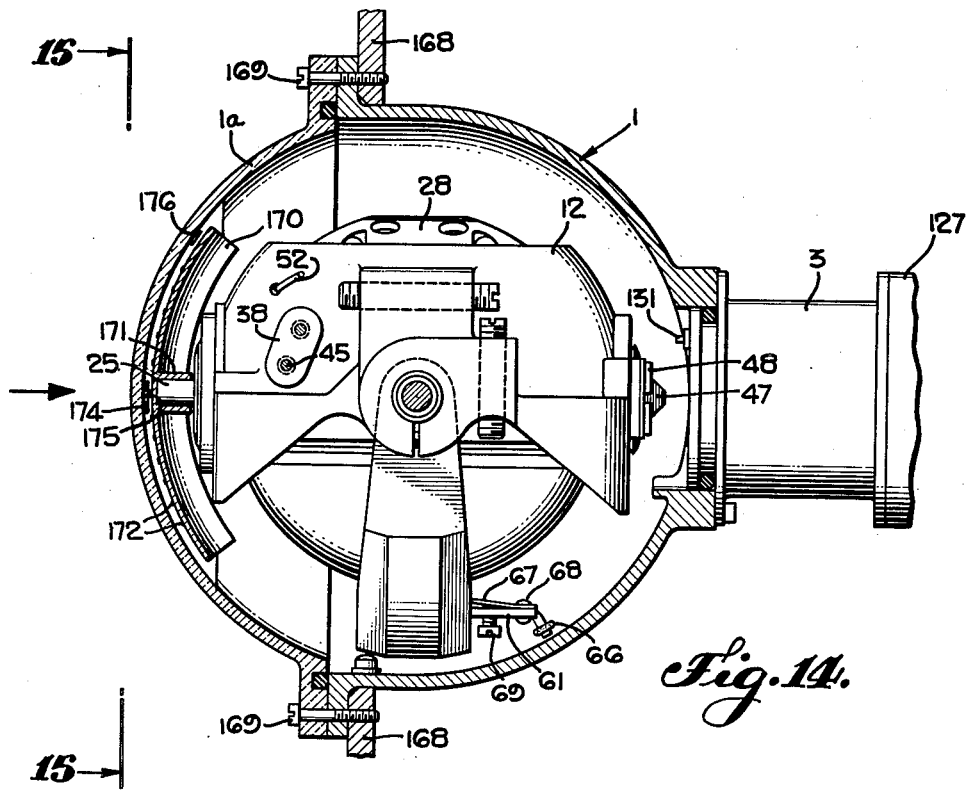
Fig. 14 is a view similar to Fig. 7 showing a visual indicator connected to the inner gimbal of the gyroscope.
Figure 15:
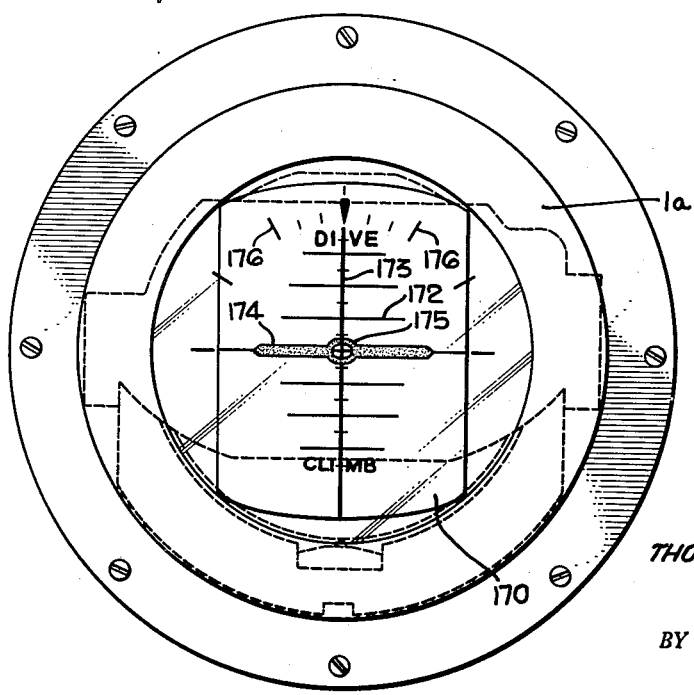
Fig. 15 is a view in front elevation taken in direction of arrows 15—15 of Fig. 14 showing the visual indicator.

A modification of the invention is shown in Figs. 14 and 15 wherein a visual indicator is provided as a navigational aid for the pilot. One section of divided casing 1 is replaced by a transparent section 1a and supporting brackets 168 are secured to the casing by screws 169. The indicator 170 has a cylindrical projection 171 for receiving the end of shaft 25, which serves as one support for inner gimbal 23. The face of the indicator carries a series of transverse lines 172 and a vertical line 173. The transparent section 1a has a transverse indicating member 174, which has an enlarged opening 175 at its center through which the lines 172 on indicator 170 can be observed. The member 174 cooperates with the lines 172 to designate the amount of dive or climb of the aircraft. Also, a series of lines 176 are placed in an arc on the surface of transparent section 1a so as to cooperate with line 173 on the face of the indicator and designate the amount of turn of the aircraft either to the right or the left. Thus, when the aircraft goes into a turn or a change in pitch, the casing of the instrument will move with the aircraft relative to the gyroscope which has been erected for straight and level flight and any deviation from the straight and level flight condition can be visually observed by the pilot.

From the above description, it is apparent that the instrument of this invention can be relied upon to maintain the aircraft on a perfectly straight and level course regardless of the out-of-trim forces inherent in the aircraft. For the purposes of the present disclosure, the terms "craft" and "aircraft" are interpreted as including all types of air, land and water craft, and all types of missiles and vehicles, in addition to the ordinary connotations associated with the words. Various modifications are contemplated and may obviously be resorted to by those skilled in the art, without departing from the spirit and scope of the invention, as hereinafter defined by the appended claims.

What is claimed is:

1. In a gyroscopic navigational instrument for an aircraft, a casing supported by said aircraft, a gyro rotor universally supported within said casing, means for case erecting said gyro rotor about the roll axis of said aircraft during straight flight to obtain a straight flight reference position for said rotor, means controlled by said gyro when in said reference position to correct for deviations of the aircraft from straight flight.

2. In a gyroscopic navigational instrument for an aircraft, a casing supported by said aircraft, a gyro rotor universally supported within said casing, means movable with said casing about the roll axis of said aircraft for erecting said rotor to a fixed position with respect to said casing, means for tilting said aircraft and the gyro rotor about said roll axis to a straight flight position and means under control of said gyro rotor when in said straight flight position for preventing the aircraft from turning.

3. In a gyroscopic navigational instrument for an aircraft, a casing rigid with said aircraft, a gyro rotor universally supported within said casing, means movable with said aircraft about its roll axis for erecting said rotor to a predetermined position with respect to said aircraft, said rotor being erected by said means to a straight flight reference position during straight flight of the aircraft, and means responsive to said gyro position to maintain said aircraft in straight flight.

4. In a gyroscopic navigational instrument for an aircraft, a casing rigidly secured to said aircraft, a gyro rotor supported within said casing by inner and outer gimbals, means movable with said casing about the roll axis of said aircraft for case erecting said rotor, and means positioned by said rotor for controlling the roll attitude of said aircraft.

5. In a gyroscopic navigational instrument for an aircraft, a casing rigidly secured to said aircraft, a gyro rotor supported within said casing by inner and outer gimbals, a pendulous bail pivotally mounted about the pitch axis of said aircraft, erector means carried by said bail to case erect said rotor about the roll axis of said aircraft, and means responsive to the position of said rotor about the roll axis for controlling the roll attitude of said aircraft.

6. In a gyroscopic navigational instrument for an aircraft, a casing rigidly supported by an aircraft, a gyro rotor supported within said casing by inner and outer gimbals, means for case erecting said rotor in roll and gravity erecting said rotor in pitch and means responsive to the position of said gyro rotor for controlling both the roll and pitch attitude of said aircraft.

7. In a gyroscopic navigational instrument for an aircraft as defined in claim 6 wherein said last mentioned means includes manually movable means for changing the pitch or roll of said aircraft.

8. In a gyroscopic navigational instrument for an aircraft, a casing supported by said aircraft, a gyro rotor supported within said casing by inner and outer gimbals, a single means for case erecting said gyro rotor about the roll axis of said aircraft and simultaneously gravity erecting said gyro rotor about the pitch axis of said aircraft, means associated with said gyro rotor for maintaining a fixed roll attitude for said aircraft and means associated with said gyro rotor for maintaining a fixed pitch attitude for said aircraft.

9. In a gyroscopic navigational instrument for an aircraft, a casing supported by said aircraft, a gyro rotor supported within said casing by inner and outer gimbals, means for case erecting said gyro rotor about the roll axis of said aircraft to a position in space that provides a straight flight reference for the aircraft, means for gravity erecting said gyro rotor about the pitch axis of said aircraft to a position that provides a level flight reference for the aircraft and means responsive to said gyro rotor position to maintain the aircraft on a straight and level course.

10. In a gyroscopic navigational instrument, a casing rigidly secured to an aircraft, a gyro rotor supported within said casing by inner and outer gimbal, means for case erecting said rotor about the roll axis of said aircraft and gravity erecting said rotor about the pitch axis of said aircraft, means positioned by said rotor for controlling the roll and pitch of said aircraft and means responsive to atmospheric pressure for controlling the altitude of said aircraft.

11. In combination, a casing rigidly supported by an aircraft, a gyro rotor supported within said casing by inner and outer gimbals, means for case erecting said rotor about the roll axis of said aircraft and gravity erecting said rotor about the pitch axis of said aircraft and means positioned by said rotor to visually indicate the roll and pitch attitude of said aircraft.

12. In combination, a gyro casing carried by an aircraft, a gyro rotor supported within said casing by inner and outer gimbals, means for case erecting said gyro rotor about the roll axis of said aircraft and gravity erecting said gyro rotor about the pitch axis of said aircraft, first means positioned by said rotor with respect to said roll axis, second means movable with said aircraft about its roll axis and coacting with said first means to correct for turning movements of said aircraft, third means positioned by said rotor with respect to said pitch axis, and fourth means movable with said aircraft about its pitch axis and coacting with said third means to correct for pitching movements of said aircraft.

13. In the combination of claim 12 wherein said second means includes manually operated means for changing the roll attitude of said aircraft and said fourth means includes manually operated means for changing the pitch attitude of said aircraft.

14. In the combination of claim 12, fifth means responsive to changes in atmospheric pressure for adjusting said fourth means to maintain said aircraft at a desired altitude.

15. In a gyroscopic navigational instrument for an aircraft, a casing rigid with said aircraft, a gyro rotor supported within said casing by inner and outer gimbals, means for rotating said rotor about its spin axis, a single pendulous bail pivotally supported about the pitch axis of said aircraft, erecting means carried by said bail to case erect said spin axis about the roll axis of said aircraft and gravity erect said spin axis about the pitch axis of said aircraft, said spin axis being moved by said erecting means to its straight flight reference position during straight flight of said aircraft, first means positioned by said rotor with respect to said roll axis, second means movable with said aircraft about its roll axis and coacting with said first means to correct for deviations of said aircraft from straight flight, third means positioned by said rotor with respect to said pitch axis and fourth means movable with said aircraft about its pitch axis and coacting with said third means to correct for deviations of said aircraft from level flight.

16. In a gyroscopic navigational instrument as defined in claim 15 wherein said second means includes manually operated means for changing the roll attitude of said aircraft and said fourth means includes manually operated means for changing the pitch attitude of said aircraft.

17. In a gyroscopic navigational instrument for an aircraft, a casing rigid with said aircraft, a gyro rotor supported within said casing by inner and outer gimbal, means for rotating said rotor about its spin axis, a pendulous bail pivotally supported about the pitch axis of said aircraft so as to be gravity sensitive about said pitch axis, said bail following movements of said aircraft about the roll axis, a frictional erector means carried by said bail and continually in contact with said rotor to case erect said rotor about the roll axis and gravity erect said rotor about the pitch axis, first means movable with said aircraft about its roll axis to sense turning movements of said aircraft and second means movable with said aircraft about its pitch axis to sense pitching movements of said aircraft.

18. In a gyroscopic navigational instrument for an aircraft, a casing, a gyro rotor supported within said casing by inner and outer gimbals and having a dome attached thereto, said outer gimbal axis lying along the transverse axis of said aircraft, a pendulous bail pivotally mounted about the outer gimbal axis and carrying an erector, said erector being in continuous contact with said dome to case erect said gyro rotor about the roll axis of said aircraft and to gravity erect said gyro rotor about the pitch axis of said aircraft, a first potentiometer winding mounted on said casing and coacting with a first wiper arm carried by said outer gimbal, a second potentiometer winding mounted on said outer gimbal and coacting with a second wiper arm carried by said inner gimbal, a pitch servo connected to said first potentiometer winding and responsive to movements of said first winding with respect to said first wiper arm to control the pitch attitude of said aircraft, a roll servo connected to said second potentiometer winding and responsive to movements of said second winding with respect to said second arm to control the roll attitude of said aircraft.

19. In combination, a casing secured to an aircraft, a gyro rotor supported within said casing by inner and outer gimbals, a single means for case erecting said gyro rotor about the roll axis of said aircraft and simultaneously gravity erecting said gyro rotor about the pitch axis of said aircraft, a potential source positioned by said rotor, a winding in contact with said source and movable with said aircraft about one of its axis, a servo connected to both ends of said winding, a manually operable potentiometer interposed between one end of said winding and said servo, the output of said servo being varied by movements of said winding and by adjustments of said potentiometer.

20. In a gyroscopic navigational instrument for an aircraft, a casing supported by said aircraft, a gyro rotor supported within said casing by at least a roll gimbal, means for case erecting said gyro rotor about the roll axis of said aircraft to a straight flight reference position determined by the attitude of said aircraft about the roll axis during straight flight, and means controlled by said gyro rotor when in said reference position to maintain the straight flight attitude of said aircraft.

21. In a gyroscopic navigational instrument for an aircraft, a casing rigidly secured to said aircraft, a gyro rotor supported within said casing by at least a roll gimbal, erecting means for case erecting said gyro rotor about the roll axis of said aircraft, control means positioned about said roll axis and responsive to the position of said gyro rotor to control the roll attitude of the aircraft and means for biasing said control means to position the aircraft for straight flight.

22. In a gyroscopic navigational instrument for an aircraft, a gyro rotor supported within said casing by at least a roll gimbal, erecting means for case erecting said gyro rotor about the roll axis of said aircraft, potentiometer means for controlling the roll attitude of said aircraft comprising a winding movable with said aircraft about the roll axis and a wiper positioned on said winding by said gyro rotor, and means for biasing said potentiometer means to adjust the roll attitude of said aircraft.

23. In a gyroscopic navigational instrument for an aircraft as defined in claim 22 wherein said biasing means comprises a manually operable potentiometer in series with said winding.

24. In a gyroscopic navigational instrument, a casing supported by said aircraft, a gyro rotor supported within said casing by at least a roll gimbal, a pendulous bail pivotally mounted about the pitch axis of said aircraft, erecting means carried by said bail to case erect said gyro rotor about the roll axis of said aircraft, said rotor being moved to its straight flight reference position during straight flight of said aircraft, first means positioned by said rotor with respect to said roll axis and second means movable with said aircraft about its roll axis and co-acting with said first means to correct for deviations of said aircraft from straight flight.

25. In a gyroscopic navigational instrument for an aircraft, a casing rigid with said aircraft, a gyro rotor universally supported within said casing, means for rotating said rotor about its spin axis, means for case erecting the spin axis of said rotor to a position parallel to the plane of symmetry of the aircraft, and means responsive to the position of said rotor about the roll axis for controlling the roll attitude of said aircraft.

26. In a gyroscopic navigational instrument for an aircraft, a casing rigid with said aircraft, a gyro rotor supported within said casing by inner and outer gimbals, said rotor being rotated about its spin axis, a pendulum pivotally mounted about the pitch axis of said aircraft, erecting means carried by said pendulum for case erecting the spin axis of said rotor about the roll axis of said aircraft to the plane of symmetry of said aircraft, and means responsive to the position of said rotor about the roll axis for controlling the roll attitude of said aircraft.

27. In a gyroscopic navigational instrument for an aircraft, a casing rigid with said aircraft, a gyro rotor universally supported within said casing, means for rotating said rotor about its spin axis, means for case erecting said spin axis about the roll axis of the aircraft to where it is in the same fore and aft plane as the vector sum of the aerodynamic lift forces, means to gravity erect said spin axis about the pitch axis of the aircraft so that it is in the same transverse plane as true gravity vertical, and means positioned by said rotor to continually indicate the true roll and pitch attitude of said aircraft.

28. In a gyroscopic navigational instrument for an aircraft, a casing rigid with said aircraft, a gyro rotor universally supported within said casing, means for rotating said rotor about its spin axis, means for case erecting said spin axis about the roll axis of the aircraft to where it is in the same fore and aft plane as the vector sum of the aerodynamic lift forces, means to gravity erect said spin axis about the pitch axis of the aircraft so that it is in the same transverse plane as true gravity vertical, means responsive to the position of said spin axis about the roll axis to maintain the aircraft in a roll attitude required for straight flight, and means responsive to the position of said spin axis about the pitch axis to maintain the aircraft in a pitch attitude required for level flight.

THOMAS O. SUMMERS, Jr.

References Cited in the file of this patent

UNITED STATES PATENTS

| Number | Name | Date |
|---|---|---|
| 2,190,390 | Thirp | Feb. 13, 1940 |
| 2,297,265 | Von Mantueffel | Sept. 29, 1942 |
| 2,315,501 | Crane et al. | Apr. 6, 1943 |
| 2,366,543 | Meredith | Jan. 2, 1945 |
| 2,409,875 | Martin | Oct. 22, 1946 |
| 2,443,748 | Sanders et al. | June 22, 1948 |

FOREIGN PATENTS

| Number | Country | Date |
|---|---|---|
| 365,188 | Great Britain | Dec. 19, 1931 |